United States Patent [19]

Patel

[11] 4,021,719
[45] May 3, 1977

[54] PROTECTIVE CIRCUIT FOR STATIC INVERTER

[75] Inventor: Bahechar S. Patel, Centerville, Ohio

[73] Assignee: AMF Incorporated, White Plains, N.Y.

[22] Filed: Mar. 8, 1976

[21] Appl. No.: 664,820

[52] U.S. Cl. ............................................... 321/12
[51] Int. Cl.² ...................................... H02M 1/18
[58] Field of Search ........................... 321/11–14; 307/202, 254

[56] References Cited

UNITED STATES PATENTS

| | | | |
|---|---|---|---|
| 2,872,635 | 2/1959 | Lawn | 321/18 |
| 3,027,508 | 3/1962 | Johnson | 321/19 |
| 3,490,028 | 1/1970 | Modiano | 321/2 |
| 3,495,156 | 2/1970 | Hamilton et al. | 321/11 |
| 3,601,680 | 8/1971 | Beckwith | 321/2 |
| 3,708,739 | 1/1973 | Kohler | 321/21 |

OTHER PUBLICATIONS

IBM Technical Disclosure Bulletin, vol. 16, No. 6, pp. 1840, 1841, Nov. 1973.

*Primary Examiner*—William H. Beha, Jr.
*Attorney, Agent, or Firm*—George W. Price; John H. Gallagher

[57] ABSTRACT

A protective circuit for a solid state static inverter which employs two groups of switching transistors coupled in push pull to the output transformer. If trigger pulses to one group of switching transistors is lost, the protective circuit senses the missing trigger pulses and disables both groups of switching transistors. In normal operation the protective circuit assures that only one group of switching transistors may be rendered conductive at any given time.

6 Claims, 2 Drawing Figures

PROTECTIVE CIRCUIT FOR STATIC INVERTER

BACKGROUND OF THE INVENTION

This invention relates to a protective circuit for use in a static inverter. Solid state static inverters are known which are comprised of two groups of semiconductor switching devices, the switching devices of each group being connected in parallel across a source of d.c. voltage. Each switching device has a respective primary winding of an output transformer connected in series therewith. The primary windings of the two groups are wound for push-pull energization of an output transformer. Trigger circuit means are provided for alternately triggering the switching devices of the two groups so as to establish an alternating voltage in the secondary winding of the output transformer. As is well understood, the primary windings associated with one group of conducting switching devices establish a magnetic flux field in one direction in the core of magnetic material of the output transformer and the primary windings associated with the second group of alternately conducting semiconductor devices establish a magnetic flux field in the opposite direction in the core of the output transformer. So long as the two groups of semiconductor devices conduct alternately the transformer core continues to have its magnetization reversed and the current conducted by the semiconductor switching devices will be within desired limits which is a function of the a.c. impedance of the output transformer. However, in the event that one of the groups of switching devices does not receive its trigger pulses, that group of switching devices will not be rendered alternately conductive. As a consequence, the core of the output transformer will be repetitively magnetized in the same direction by the repetitive conduction of the other group of switching devices and the magnetic material will quickly become magnetically saturated. With the core saturated the a.c. impedance of the transformer is significantly reduced and the current flowing through each of the switching devices of that other conducting group quickly may become great enough to damage those switching devices.

Circuits are known which are intended to protect a static inverter against damage which would otherwise result from the type of malfunction discussed above. Some of the known protective circuits employ a current sensing transformer to detect an overcurrent in the inverter output. The sensed overcurrent signal then is employed to initiate operation of the protective circuit. Circuits of this type are useful but suffer the disadvantage that the overcurrent sensing transformer is relatively large and expensive.

Other protective circuits are known but many of them suffer the disadvantages that they require relatively complex circuitry and/or are not fast enough in their operation to protect switching devices other than those having very high current ratings.

SUMMARY OF THE INVENTION

The protective circuit of this invention is relatively simple and inexpensive, and is fast acting to instantly stop the operation of the inverter in the event that one of the groups of switching devices fails to receive a trigger pulse.

DESCRIPTION OF PREFERRED EMBODIMENT

Figure 1:
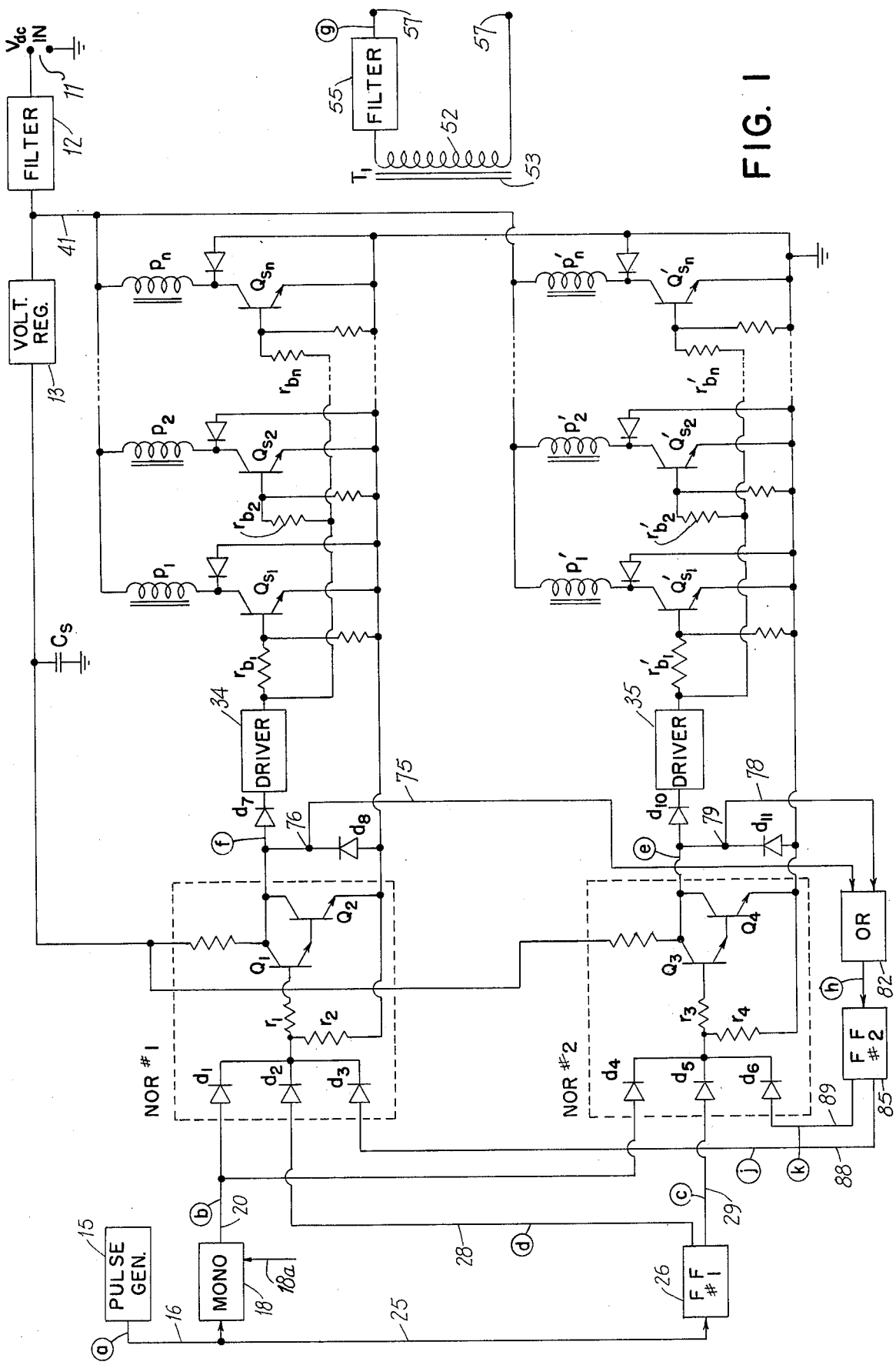
FIG. 1 is a simplified diagram, partly in schematic form and partly in block form, showing a semiconductor static inverter that includes the protective circuit of this invention.

Referring to FIG. 1, the static inverter circuit, per se, is of a type well known to those skilled in the art. For this reason the inverter circuit is shown in simplified form and without some of the ancillary features such as voltage and current regulation which commonly are included in static inverters of this type. A more detailed illustration and description of a solid state static inverter of a type in which the present invention may be utilized is contained in copending U.S. Pat. application Ser. No. 599,148 filed July 25, 1975 in the name of Thomas W. Moore and assigned to applicant's assignee.

In FIG. 1, d.c. power to the inverter circuit is applied at input terminals 11. Input d.c. voltage is filtered in filter 12 and regulated to a 15 volt level, for example, by voltage regulator 13. Capacitor $C_s$ is a relatively large storage capacitor coupled to the output of voltage regulator 13. A storage capacitor of this type commonly is provided as an aid to minimize a drop in line voltage in the presence of a sudden demand. A short time is required after initial energization of the system for the voltage across capacitor $C_s$ to build up to full line voltage. It will be noted that only the portion of the circuitry illustrated in schematic form is shown connected to the power source. The portion of the circuitry illustrated in block form may be comprised of well known individual circuits, and for simplicity of illustration and description, the connections to the source of power, where applicable, have been omitted.

Pulse generator 15, a relaxation oscillator for example, produces the output pulses of FIG. 2a at a rate twice the frequency of the desired output frequency of the inverter circuit. For purpose of discussion it will be assumed that the repetition frequency of pulse generator 15 is 800 pulses per second.

The output of pulse generator 15 is coupled over lead 16 to the input of a monostable circuit 18 which produces a negative going control pulse of given duration in response to each input pulse from pulse generator 15; see the waveform of FIG. 2b. Monostable circuit 18 may include an input lead 18a which couples a voltage and/or current sensing feedback signal to a time constant circuit in monostable circuit 18 to vary the duration of the negative going control pulses of waveform FIG. 2b in such a manner as to achieve a degree of voltage and/or current regulation as a function of inverter output voltage and/or current. Lead 18a corresponds to lead 65 in FIG. 1 of the above-mentioned Moore application.

The output of pulse generator 15, FIG. 2a, is coupled over leads 16 and 25 to the input of a first flip flop circuit 26. The two output signals of flip flop circuit 26 are 400 Hz square waves which are 180° out of phase, FIGS. 2c and 2d. These output waveforms are coupled over respective output leads 28 and 29 to one input of a respective NOR gate No. 1 and No. 2.

A second input to each of the NOR gates No. 1 and No. 2 is the output lead 20 of monostable circuit 18.

The signal on this lead 20 is the 800 pulse per second control pulses of waveform FIG. 2b.

As illustrated in FIG. 1, NOR gate No. 1 is comprised of like poled diodes d1, d2 and d3 whose cathodes are connected together. Resistors r1 and r2 couple the cathodes of diodes d1, d2, and d3 to the base electrode of the n-p-n transistor Q1. The two transistors Q1 and Q2 are connected in a Darlington configuration. The compound connected transistors Q1 and Q2 are connected across the d.c. power supply.

In the operation of NOR gate No. 1, the output at the collectors of transistors Q1 and Q2 is high only if the input signals coupled to the anode electrodes of all the diodes d1, d2 and d3 are low. If one or more of the inputs to diodes d1, d2 and d3 is high, the output of the NOR gate is low.

NOR gate No. 2 is comprised of diodes d4, d5, d6, resistors r3 and r4 and the compound connected transistors Q3 and Q4. NOR gate No. 2 operates identically to NOR gate No. 1.

Assuming for the moment that the bottommost input to each of the NOR gates No. 1 and No. 2 is low, we may consider that NOR gate No. 1 produces a positive going output, FIG. 2f, when the waveforms of FIGS. 2b and 2d applied to its two uppermost inputs both are low. Similarly, we may consider that NOR gate No. 2 produces a positive going output, FIG. 2e, when the waveforms FIGS. 2b and 2c applied to its two uppermost inputs both are low. Because the two 400 Hz output signals from flip flop 26 are out of phase, FIGS. 2c and 2d, and because the negative control pulses from monostable circuit 18 are at a rate of 800 pulses per second, FIG. 2b, NOR gates No. 1 and No. 2 will operate alternately on successive control pulses from monostable circuit 18 to produce the respective alternately occurring trigger pulses of FIGS. 2f and 2e.

The outputs of NOR gates No. 1 and No. 2 are amplified in respective driver circuits 34 and 35. The two series of amplified pulses are coupled in parallel to the base electrodes of respective groups of parallel connected switching transistors $Qs1, Qs2 \ldots Qsn$ and $Qs1', Qs2' \ldots Qsn'$ through correspondingly designated base resistors. In practice, any required number of switching transistors, from one up to approximately 10, may be used in a group.

Each switching transistor has a primary winding p of an output transformer T1 connected between its collector electrode and the lead 41 which is connected to the d.c. power source. The two groups of primary windings $p1, p2 \ldots pn$ and $p1', p2' \ldots pn'$ are wound push pull on the transformer T1. Because the two groups of switching transistors $Qs1, Qs2 \ldots Qsn$ and $Qs1', Qs2' \ldots Qsn'$ conduct alternately in response to the alternately occurring series of trigger pulses of FIGS. 2e and 2f, the two groups of primary windings are alternately excited in push-pull fashion to produce in the secondary winding 52 of transformer T1 an a.c. output of generally rectangular waveform. This waveform is filtered by filter circuit 55 to improve its waveform and then is coupled to output terminals 57 as the output waveform of FIG. 2g.

Output transformer T1 is a conventional type and includes a core 53 of magnetic material such as laminated iron. In normal operation, the magnetic material of core 53 is operated below its magnetic saturation region.

The circuitry thus far described is a basic inverter of the type in which the present invention is useful. As described in the above-mentioned Moore application, the inverter circuitry may contain other features such as voltage and/or current regulation, and may include start up protection to limit the initial surge of current through the switching transistors. Because means for accomplishing these features are known in the art and form no part of the present invention they will not be further described.

In the event that some malfunction in the circuitry of FIG. 1 should result in the loss of one of the series of trigger pulses, the pulses of FIG. 2e for example, the second group of switching transistors $Qs1', Qs2' \ldots Qsn'$ would not be switched into conduction and their respective primary windings $p1', p2' \ldots pn'$ would not be energized. The first group of switching transistors $Qs1, Qs2 \ldots Qsn$ would, however, continue to be switched to repetitively conduct and energize their respective primary windings $p1, p2 \ldots pn$. Consequently, the magnetic material of the transformer core 53 would be repetitively magnetized in the same direction and quickly would reach magnetic saturation. This would significantly decrease the a.c. impedance of the transformer and would cause the switching transistors $Qs1, Qs2 \ldots Qsn$ to conduct excessive current from the d.c. source. This can quickly result in damage and destruction of the operating switching transistors.

In accordance with the present invention means are provided for detecting when a trigger pulse is missing and for instantly disabling the normally operating group of switching transistors. In FIG. 1, the output of NOR gate No. 1 is sampled by a lead 75 which is coupled to junction 76 between the anode of diode d7 and the cathode of diode d8. Similarly, the output of NOR gate No. 2 is sampled by lead 78 which is coupled to junction 79 between the anode of diode d10 and the cathode of diode d11. Consequently, in normal operation, the two inputs to OR gate 82 are the alternately occurring series of pulses of FIGS. 2e and 2f. This combined input signal to OR gate 82 is represented by the waveform of FIG. 2h.

The output of OR gate 82 is coupled to the input of a second flip flop circuit 85 which operates to change from one bistable state to the other each time the waveform FIG. 2h goes negative. Consequently, the output signals on output leads 88 and 89 of flip flop 85 are the waveforms of FIGS. 2j and 2k. The waveform of FIG. 2j on lead 88 is coupled to the anode of diode d3 as the third input of NOR gate No. 1 and the waveform of FIG. 2k is coupled on lead 89 to the anode of diode d6 as the third input to NOR gate No. 2. It will be remembered that whenever any one of the input signals to a NOR gate is high the output of the gate is low and no trigger pulse is coupled therethrough to the corresponding group of switching transistors.

Figure 2:
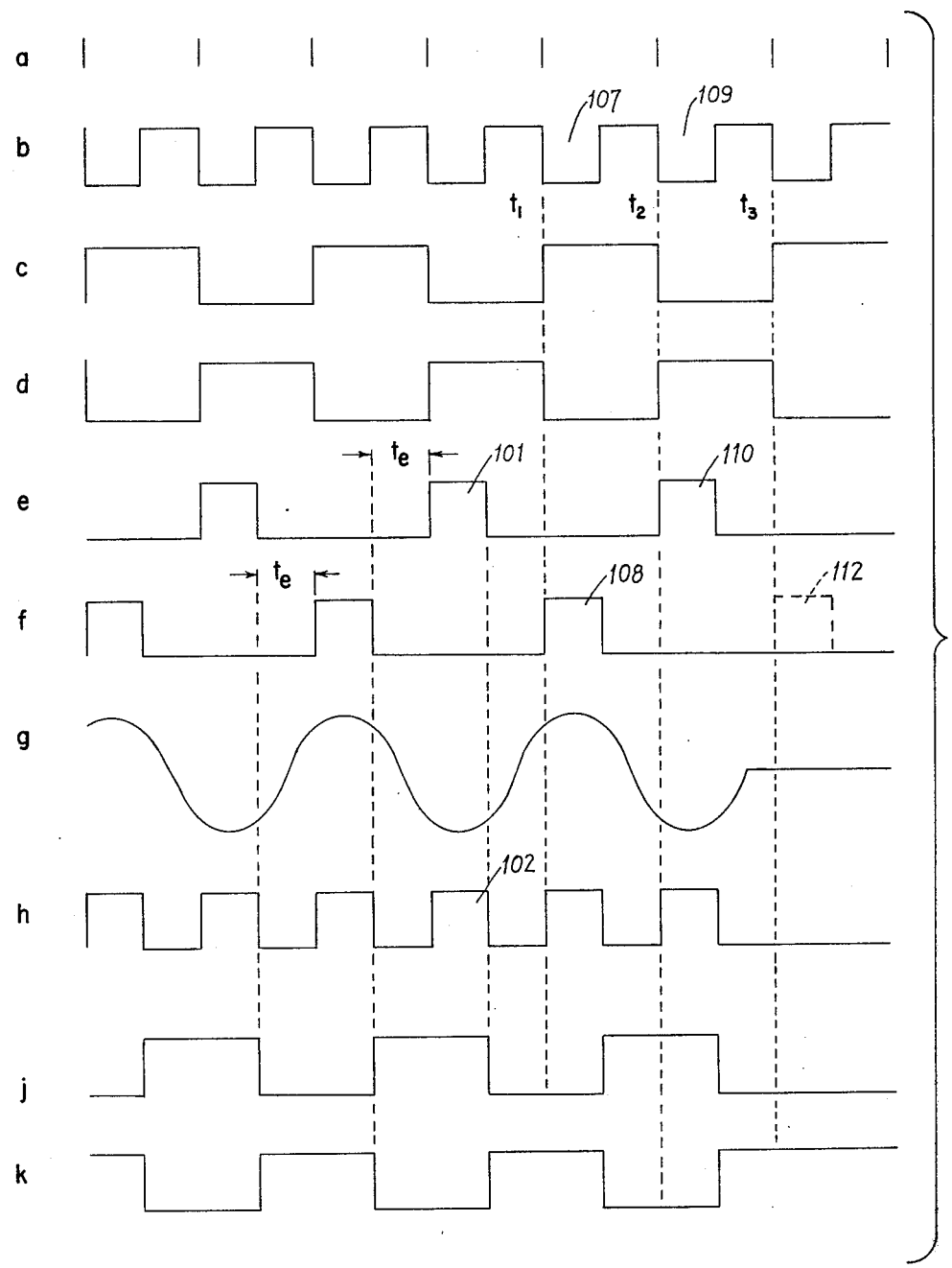
FIG. 2 is a series of waveforms that are used in describing the operation of the circuit of FIG. 1.

Considering first the operation of the protective circuit of this invention during normal operation, and assuming that the trigger pulse 101 of FIG. 2e is present, this pulse is sensed on lead 78 and is coupled through OR gate 82 as the pulse 102 of waveform FIG. 2h. The negative going trailing edge of this pulse causes flip flop 85 to change states so that waveform of FIG. 2j goes low and the waveform of FIG. 2k goes high. At time $t_1$, FIG. 2, when negative control pulse 107 of waveform FIG. 2b occurs, the waveform of FIG. 2d is low, as is the waveform of FIG. 2j. Consequently, all three inputs to NOR gate No. 1 are low and a trigger pulse of FIG. 2f is coupled to switching transistors $Qs1$, $Qs2 \ldots Qsn$. At this same time $t_1$, the input signal FIG.

$2k$ to NOR gate No. 2 is high and the output of that gate must be low, thus preventing a trigger pulse from being coupled to the second group of switching transistors $Qs1'$, $Qs2'$ ... $Qsn'$.

Consider next the time $t_2$ when the next control pulse 109 of FIG. 2b occurs. The waveform FIG. 2c is low, as is the waveform FIG. 2k. These three low inputs to NOR gate No. 2 cause the trigger pulse 110 of FIG. 2e to pass and trigger the second group of switching transistors $Qs1'$, $Qs2'$ ... $Qsn'$. At this same time $t_2$ the waveform $2j$ from flip flop 85 of the protective circuit is high, thus effectively disabling NOR gate No. 1 and preventing a gating pulse from being coupled to the first group of switching transistors $Qs1$, $Qs2$ ... $Qsn$.

From the above description it is seen that the second flip flop 85 operates to alternately enable the first NOR circuit and disable the second one, and then disable the first NOR circuit and enable the second one. By comparing the waveforms of FIGS. $2f$ and $2j$, and the waveforms of FIGS. $2e$ and $2k$, it will be seen that the respective disabling signals $2j$ and $2k$ are removed from the NOR gates a short time $t_e$ before the expected occurrence of a trigger pulse.

Next consider the time $t_3$ and the waveform of FIG. $2f$. It is assumed here that for some reason the next expected trigger pulse for the first group of switching transistors $Qs1$, $Qs2$ ... $Qsn$ did not actually occur, this being indicated by the pulse 112 in broken lines. The absence of pulse 112 means that OR gate 82 in the protective circuit receives no input at this time, FIG. $2h$. Flip flop 85 will not change states, FIGS. $2j$ and $2k$. Consequently, waveform FIG. $2k$ remains high, and since this is one input to NOR gate No. 2, this gate is effectively disabled to prevent the triggering of the second group of switching transistors $Qs1'$, $Qs2'$ ... $Qsn'$. It may be seen by this example that the absence of a trigger pulse for the first group of switching transistors will cause the blocking of the NOR gate No. 2 associated with the second group of switching transistors. The operation of the inverter circuit therefore is effectively shut down since both groups of switching transistors are disabled.

By following through the operation of the circuit of FIG. 1 with the aid of the waveforms of FIG. 2 it may be seen that in like manner if the trigger pulses of FIG. $2e$ are lost and the second group of switching transistors $Qs1'$, $Qs2'$ ... $Qsn'$ are thereby disabled, the protective circuit of this invention will function to cause the waveform of FIG. $2j$ to remain high at one input to NOR gate No. 1, thereby to cause the output of that gate to go low and disable the first group of switching transistors.

Another way of looking at the above operation is as follows. By comparing the waveforms FIGS. $2f$ and $2j$ which are, respectively, the trigger pulse output of NOR gate No. 1 and the protective circuit input to that gate, it is seen that the negative going terminating edge of each trigger pulse of FIG. $2f$ causes the waveform of FIG. $2j$ to go positive, thus to disable NOR gate No. 1. Thus each time that NOR gate No. 1 passes a trigger pulse it automatically, at the end of the pulse, becomes disabled. NOR gate No. 1 can be enabled only by the waveform of FIG. $2j$ going low. This can occur only by a trigger pulse from NOR gate No. 2 passing OR gate 82 and resetting flip flop 85 to its other stable state. If that other trigger pulse from NOR gate No. 2 does not appear, NOR gate No. 1 remains disabled.

By comparing the waveforms of FIGS. $2e$ and $2k$, which are, respectively, the trigger pulse output and protective circuit input to NOR gate No. 2, it also will be seen that a trigger pulse output of NOR gate No. 2 causes the waveform of FIG. $2k$ to go high to disable NOR gate No. 2. If NOR gate No. 1 does not subsequently pass a trigger pulse to set flip flop 85, waveform FIG. $2k$ remains high to keep NOR gate No. 2 disabled.

In the presently preferred embodiment of the invention illustrated in FIG. 1, NOR logic gates are used. It is to be understood that the same results may be achieved by employing other logic functions and circuits. In essence, the NOR gates are coincidence circuits or gates which pass a desired signal only when the input signals thereto are of respective predetermined values at the same time.

Although transistors are illustrated as the controllable conduction devices for switching d.c. current through the transformer primary windings other suitable controlled conduction devices may be employed without departing from the teachings of the present invention.

In its broader aspects, this invention is not limited to the specific embodiment illustrated and described. Various changes and modifications may be made without departing from the inventive principles herein disclosed.

What is claimed is:

1. In a static inverter that includes at least first and second controllable conduction devices parallel connected to a d.c. source and alternately operable to conduct current from said d.c. source, and wherein said alternately operable conduction devices produce an a.c. signal in output means coupled thereto, the improvement of means for terminating operation of one of said controllable conduction device in the event that the other one fails to receive trigger pulses for operation thereby, said improvement comprising means for producing a first series of trigger pulses which occur at a given repetition rate, means for producing a second series of trigger pulses which occur at said given repetition rate and which occur in alteration with pulses of said first series, means for coupling said first series of trigger pulses to one of said controllable conduction devices, means for coupling said second series of trigger pulses to the other one of said controllable conduction devices, means for coupling said controllable conduction devices to output means for producing therein an a.c. signal, means coupled to said means for producing said first and said second series of trigger pulses for sensing the occurrence of said trigger pulses, bistable means operable in response to sensed trigger pulses for producing on first and second output leads enable and inhibit signals, said enable and inhibit signals occurring on opposite ones of the two output leads and alternating between said two output leads in response to successively sensed trigger pulses, means for coupling each of said output leads to a respective one of said means for producing a series of trigger pulses for inhibiting that one of the means for producing trigger pulses which last produced a trigger pulse and for enabling the other one of the means for producing trigger pulses, whereby if either one of the means for producing trigger pulses should fail to produce a trigger pulse the other one also will become disabled.

2. The combination claimed in claim 1 wherein each of said means for producing a series of trigger pulses includes a gate means, each of said output leads of the bistable means being coupled to a respective one of said gate means for coupling said enable and inhibit signals thereto.

3. The combination claimed in claim 2 wherein said means for sensing the occurrence of trigger pulses is coupled to the output of each of said gate means.

4. In a static inverter employing at least two controllable conduction devices each connected to a d.c. source and alternately operable in response to respective series of alternately occurring trigger pulses to energize output means to produce an a.c. output signal having a frequency equal to the repetition frequency of each of said series of trigger pulses, said inverter comprising means for producing a series of control pulses having a repetition frequency twice the frequency of said a.c. output signal, means for producing first and second alternating signals which are in substantial phase opposition with respect to each other and at a frequency equal to said a.c. output signal, first and second coincidence means, means for coupling said control pulses to both of said coincidence means, means for coupling said first alternating signal to said first coincidence means and means for coupling said second alternating signal to said second coincidence means, each of said coincidence means operating to produce a trigger pulse when the control signal and the respective alternating signal have a predetermined relationship, whereby said two coincidence means normally operate in alternation to produce respective series of alternately occurring trigger pulses, means for coupling one of said series of trigger pulses to one of said controllable conduction devices and for coupling the second series of trigger pulses to the other one of said controllable conduction devices, means for coupling said controllable conduction devices to output means for producing an a.c. signal therein, means coupled to said two coincidence means for sensing the trigger pulses from both coincidence means, and bistable means operable between first and second stable states in response to successively sensed trigger pulses for disabling the coincidence means which last produced a trigger pulse and for enabling the other one of said coincidence means.

5. The combination claimed in claim 4 wherein said bistable means is a flip flop circuit having first and second output leads having complementary signals thereon which alternate in magnitude as the circuit changes between stable states, and means for coupling each of said output leads to the input of a respective one of said coincidence circuits.

6. In a static inverter employing at least two controllable conduction devices parallel connected to a d.c. source and alternately operable in response to respective series of alternately occurring trigger pulses to energize a transformer to produce an a.c. output signal at a frequency equal to the repetition frequency of each of said series of trigger pulses, and wherein said trigger pulses are produced by means which includes means for producing a series of control pulses at a frequency twice that of each series of trigger pulses, means for producing first and second alternating signals which are in phase opposition and at the frequency of the trigger pulses, said means for producing the trigger pulses further including first and second coincidence means each coupled to receive said control pulses and each coupled to receive a respective one of the alternating signals, each coincidence means being operable to produce a trigger pulse when said control pulse and the respective alternating signal have a predetermined relationship, each of said controllable conduction devices being coupled to a respective one of said coincidence means, the improvement of means for disabling one of the coincidence means to prevent it from producing trigger pulses in the event that the other coincidence means fails to produce trigger pulses, said improvement comprising means for sensing the trigger pulses from both of said coincidence means, bistable means coupled to receive sensed trigger pulses and having first and second output leads each coupled to the input of a respective one of said two coincidence means, said bistable means operating in response to a sensed trigger pulse to produce a disable signal on its output lead which is coupled to the coincidence means which last produced a trigger pulse and to produce an enable signal on its output lead which is coupled to the other one of the coincidence means.

* * * * *